(12) United States Patent
Neesham (10) Patent No.: US 12,029,296 B2
(45) Date of Patent: Jul. 9, 2024

(54) EXTENDABLE AND RETRACTABLE LUGGAGE

(71) Applicant: Tony Neesham, Kennebunk, ME (US)

(72) Inventor: Tony Neesham, Kennebunk, ME (US)

( * ) Notice: Subject to any disclaimer, the term of this patent is extended or adjusted under 35 U.S.C. 154(b) by 162 days.

(21) Appl. No.: 17/941,004

(22) Filed: Sep. 8, 2022

(65) Prior Publication Data
US 2023/0346093 A1 Nov. 2, 2023

Related U.S. Application Data

(63) Continuation-in-part of application No. 17/733,504, filed on Apr. 29, 2022.

(51) Int. Cl.
*A45C 7/00* (2006.01)
*A45C 5/03* (2006.01)
*A45C 5/14* (2006.01)
*A45C 13/26* (2006.01)

(52) U.S. Cl.
CPC .............. *A45C 7/0031* (2013.01); *A45C 5/14* (2013.01); *A45C 13/26* (2013.01); *A45C 2005/037* (2013.01); *A45C 2013/267* (2013.01)

(58) Field of Classification Search
CPC ......... A45C 7/0031; A45C 5/14; A45C 13/26; A45C 2005/037; A45C 2013/267
See application file for complete search history.

(56) References Cited

U.S. PATENT DOCUMENTS

| 1,184,525 A | * | 5/1916 | Hammond | ........... A45C 7/0031 |
| | | | | 220/8 |
| 2023/0116662 A1 | * | 4/2023 | Vaynshteyn | ............. A45C 5/03 |
| | | | | 190/103 |

FOREIGN PATENT DOCUMENTS

| CN | 109393695 A | * | 3/2019 | ............... A45C 5/04 |
| CN | 109662417 A | * | 4/2019 | ............... A45C 5/04 |
| CN | 113520002 A | * | 10/2021 | |
| KR | 102258863 B1 | * | 5/2021 | |

* cited by examiner

*Primary Examiner* — Tri M Mai
(74) *Attorney, Agent, or Firm* — Sue C. Watson; Southern Plains IP Law PLLC (57) ABSTRACT

Extendable and retractable luggage comprises a housing including a first compartment therein for storage. The luggage also includes a module movably connected to the housing. The module includes a second compartment in communication with the first compartment of the housing. The module is configured to move within the housing in a retracted position and extend away from the housing in an extended position. The housing and the module are in an axial alignment, such that both the extended and retracted positions of the module within the housing are maintained in the axial alignment. A portion of the module and a portion of the housing overlap each other and connect together when in the extended position, and when the module is positioned within the portion of the housing, a frame at a lower end of the module is positioned against a rim of the housing to provide the retracted position.

15 Claims, 13 Drawing Sheets

EXTENDABLE AND RETRACTABLE LUGGAGE

CROSS-REFERENCE TO RELATED APPLICATIONS

The present invention is a non-provisional utility patent application which is a continuation-in-part of U.S. non-provisional patent application Ser. No. 17/733,504, entitled "EXTENDABLE ROOF TOP CARGO CARRIER FOR A VEHICLE", filed Apr. 29, 2022, which is hereby incorporated by reference herein in its entirety.

FIELD OF THE INVENTION

The present invention relates to luggage. In particular, the present invention relates to luggage configured to telescopically expand and retract, which is used for travel, and in particular, airline travel.

BACKGROUND

Luggage is necessary for travel. That is, travel for work, enjoyment, vacations, when moving locations, and the like. In some instances, a single piece of luggage will suffice. Other times, more than one piece of luggage is required. Some luggage can be used as a carry-on piece of luggage when traveling by airlines, with certain size and weight restrictions. On other occasions, luggage which is larger than the carry-on limits, which comply with the restrictions of checked luggage, may be brought and checked in with the airline. Therefore, a person may need to take two pieces of luggage: one carry-on size and one checked size of luggage. Or when a traveler takes the smaller carry-on size and wishes to bring mementos of travel home, the traveler will be required to purchase another piece of luggage. Further, even if the second purchased luggage is small, only one carry-on is permitted on the majority of airlines. Therefore, large or small, one of the two pieces of luggage will need to be checked luggage. In the past, many airlines permitted at least a carry-on piece of luggage for no further cost, and based on a traveler's choice of ticket, such as, for example, first class, business class, and the like, at least one piece of checked luggage was included at no additional cost to the traveler.

However, many airlines now are charging for both carry-on and checked luggage, especially for the popular, less expensive economy class seats. Each piece of luggage, whether large or small, carry-on or checked, now frequently results in an additional cost to be borne by the traveler.

Some manufacturers of luggage have tried to address this problem by providing luggage which is in two solid parts and divided by a flexible cloth section provided internally, that is held within the luggage until one or more zippers permit a width expansion of the luggage via the cloth section. It is notable that this expansion must be limited, due to the restrictions on width propagated by each airline. Further, the cloth section may tear and/or the zipper may break, resulting in openings in the luggage, loss of items held in the luggage, and at times, separation of the two portions of the luggage.

Some manufacturers of luggage provide soft luggage formed from a cloth (for example, canvas, nylon cloth, and the like) which may be expandable within the limits required by the airlines. However, soft luggage often fails to protect fragile items held within, resulting in breakage of such items. Soft luggage is also prone to damage through rough handling, resulting in holes and tears in the soft luggage.

It would be desirable to have hard shell telescoping luggage, that is, luggage formed which strongly resists deformation even with rough handling. Such luggage, when in a retracted position, can be used as carry-on luggage, and in its expanded position, can be used as checked luggage. Such luggage would provide additional space for items without the cost of buying additional luggage. It would also reduce the airline fees when a traveler desires to bring additional items home, or, alternatively, wants to have space in a single piece of luggage to bring items to friends and/or family. Such luggage is sufficiently versatile to use in other types of travel besides airline travel (such as automobile, truck, bus, and/or train) with the same advantages.

SUMMARY

In one embodiment of the present invention, an extendable and retractable luggage adapted for travel on an aircraft comprises a housing including an outer surface. The housing includes an opening in an upper end and an upper end door connected to the housing and configured to close the opening in the upper end. The opening extends through the housing and a lower end thereof to form an inner surface which provides a first compartment for storage. The housing including an open lower end. The luggage also includes a module movably connected to the housing. The module includes an outer surface and an opening which extends therethrough which forms an inner surface and a second compartment for storage. The module includes an open upper end such that the first and second compartments are in movable cooperation to extend and retract. The first compartment is configured to permit at least a portion of the outer surface of the module and the second compartment therein to fit within the inner surface and a portion of the first compartment of the housing when the module is in a retracted position. The module is configured to extend outward away from the portion of the housing in an extended position. The housing and the module are in an axial alignment, such that the extended position and the retracted position of the module within the housing is telescopic within the axial alignment. A first margin of the module and a second margin of the housing overlap each other and connect together in the extended position. When the first margin and the second margin are released from their connection together, the module is moved into the portion of the housing, and the second margin of the housing overlaps a third margin of the module to provide the retracted position.

In one aspect of the one embodiment, the module includes at least one button assembly. A button of the at least one button assembly is positioned to retractably extend through an opening in the first margin of the module and an opening in the second margin of the housing to releasably connect the module and the housing together in the extended position.

In another aspect of the one embodiment, at least one button is adapted to connect to a lock when the luggage is in the extended position.

In an additional aspect of the one embodiment, the second margin of the housing and a frame at a lower end of the module each include a portion of a clasp assembly that, when the second margin of the housing overlaps the third margin of the module, the second margin abuts the frame, and each portion of the clasp assembly is positioned to connect together to hold the housing and the module in the retracted position.

In a further aspect of the one embodiment, the frame includes a door to permit access and closure to the lower end of the module.

In yet another aspect of the one embodiment, the door on the lower end of the module includes a plurality of wheels.

In still a further aspect of the one embodiment, the first margin is positioned next to a rim of the lower end of the housing.

In yet a further aspect of the one embodiment, the second margin is positioned next to a rim of the upper end of the module.

In another aspect of the one embodiment, the third margin is positioned next to a frame on a lower end of the module.

In a further aspect of the one embodiment, the module includes a front side opening and a front side door.

In an additional aspect of the one embodiment, the housing includes an extendable and retractable handle.

In still yet a further aspect of the one embodiment, the housing and the module are each formed from a material that forms a solid hard-shell material that resists deformation.

In another embodiment of the present invention, telescoping luggage adapted for travel on an aircraft, comprises a housing including an opening defining an inner perimeter which forms a first compartment therein for storage. The housing including an open lower end. The telescoping luggage also includes a module movably connected to the housing. The module has an opening therethrough which defines an inner perimeter which forms a second compartment therein for storage. The first compartment and the second compartment are in moveable cooperation to extend and retract. The first compartment is configured to permit at least a portion of the module to fit within the inner perimeter and a portion of the first compartment of the housing when the module is in a retracted position. The module is configured to move within the housing to extend outward, away from the portion of the housing in an extended position. The housing and the module are in an axial alignment, such that the telescoping extended position and retracted position of the module within the housing is maintained in the axial alignment. A portion of the module and a portion of the housing overlap each other and connect together when in the extended position. When the module is retracted within the portion of the housing, a frame at a lower end of the module is positioned against a rim of the housing to form the retracted position. The housing and the module are each formed from a solid hard-shell material that resists deformation.

In an aspect of the other embodiment, the portion of the module includes a first margin and the portion of the housing includes a second margin, and the first margin and the second margin overlap each other and connect together in the extended position. When the first margin and the second margin are released from their connection, the module is moved into the housing, and the second margin of the housing overlaps a third margin of the module and abuts the frame to provide the retracted position.

In another aspect of the other embodiment, the first margin is positioned near to a rim of the lower end of the housing, the second margin is positioned near to a rim of the upper end of the module, and a third margin is positioned near the frame of the module.

In a further aspect of the other embodiment, the first margin of the module includes the button assembly so that a button is positioned to retractably extend through an opening in the first margin of the module and through an opening in the second margin of the housing to releasably connect the module and the housing together in the extended position.

In yet another aspect of the other embodiment, the second margin of the housing and the frame at a lower end of the module each include a portion of a clasp assembly that, when the second margin of the housing overlaps the third margin of the module and abuts the frame of the module, each portion of the clasp assembly is positioned to connect together to hold the housing and the module in the retracted position.

In yet an additional aspect of the other embodiment, the frame includes a door to permit access and closure to the module, and wherein the door includes a plurality of wheels.

In still yet another aspect of the other embodiment, the opening in the upper end of the housing is covered by an upper end door, and the module includes a front side opening covered by a front side door.

In still a further aspect of the other embodiment, the housing includes an extendable and retractable handle.

DETAILED DESCRIPTION OF THE DRAWINGS

The disclosure will be better understood, and features set forth above will become apparent when consideration is given to the following detailed description thereof. Such description makes reference to the annexed drawings wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The variations of "comprising", "including" and "having", such as, but not by way of limitation, "comprise", "include", "have" or "has", are also included in this definition. Any examples of operating parameters and/or environmental conditions are not exclusive of other parameters/conditions of the disclosed embodiments.

Figure 1:
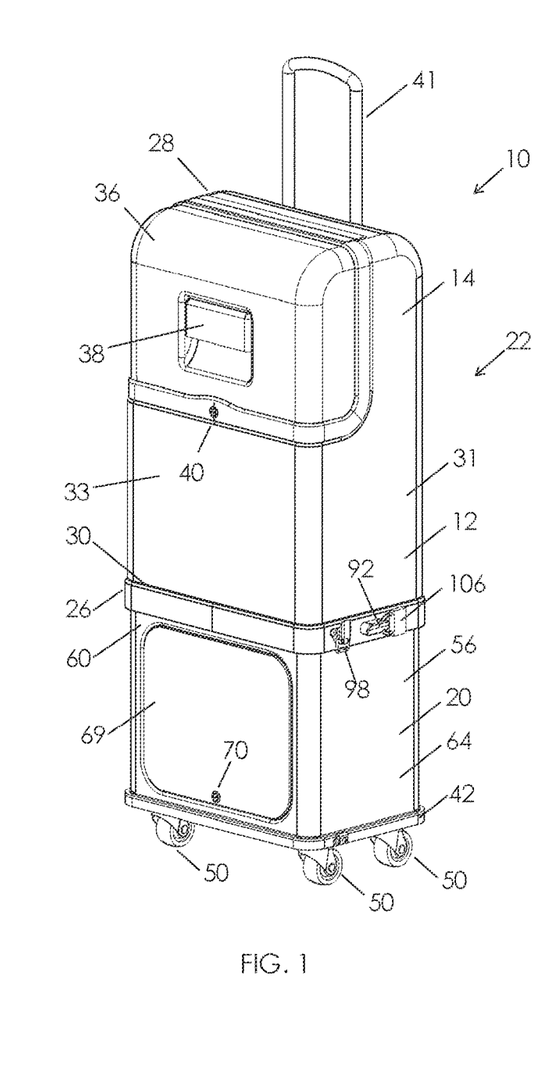
FIG. 1 is a left front perspective view of the extendable and retractable luggage according to the present invention, showing an extended position of the luggage and the travel handle.
Figure 2:
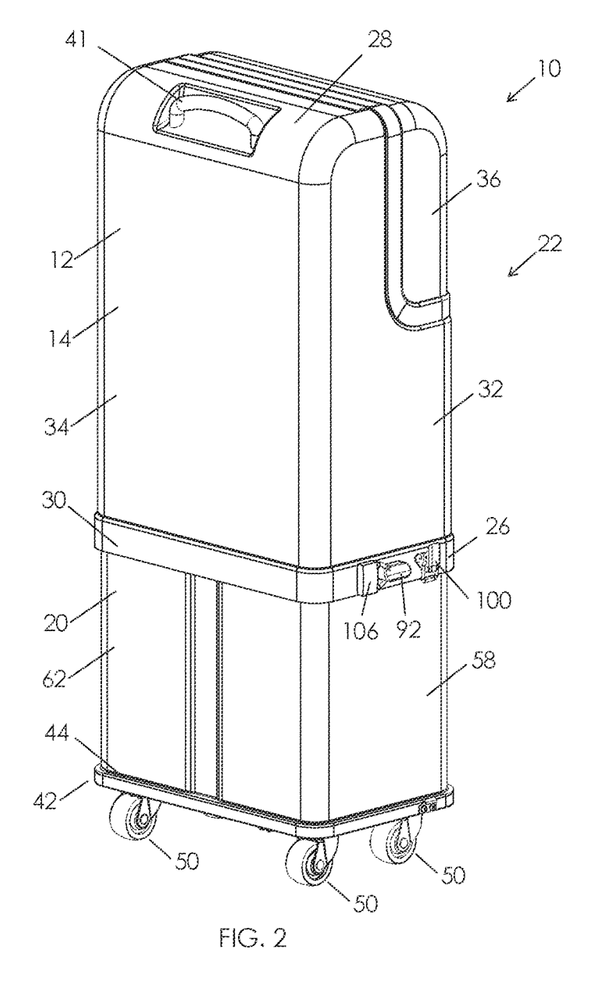
FIG. 2 is a right rear perspective view of the luggage of FIG. 1, but showing the travel handle retracted.
Figure 3:
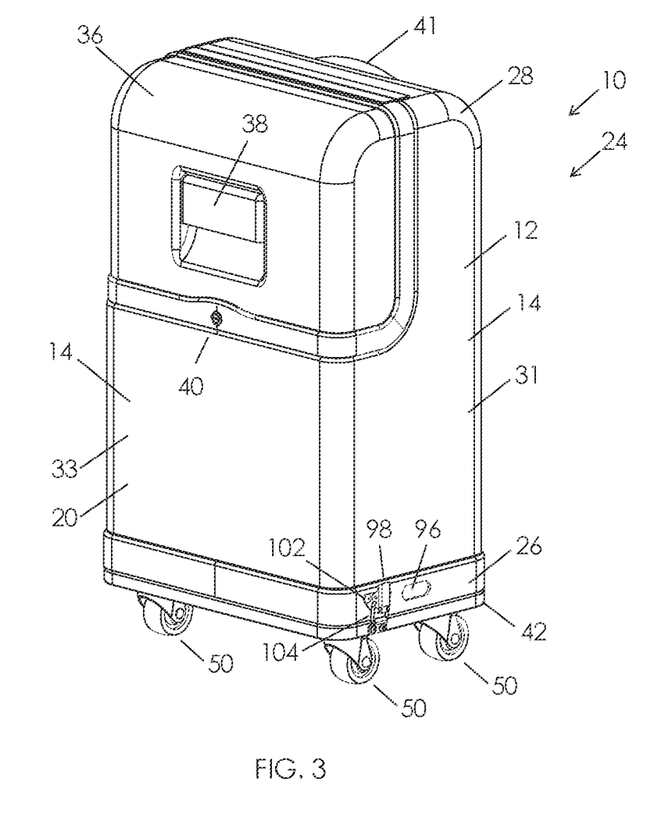
FIG. 3 is a left front perspective view of the luggage of FIG. 1, but showing the luggage in the retracted position.
Figure 4:
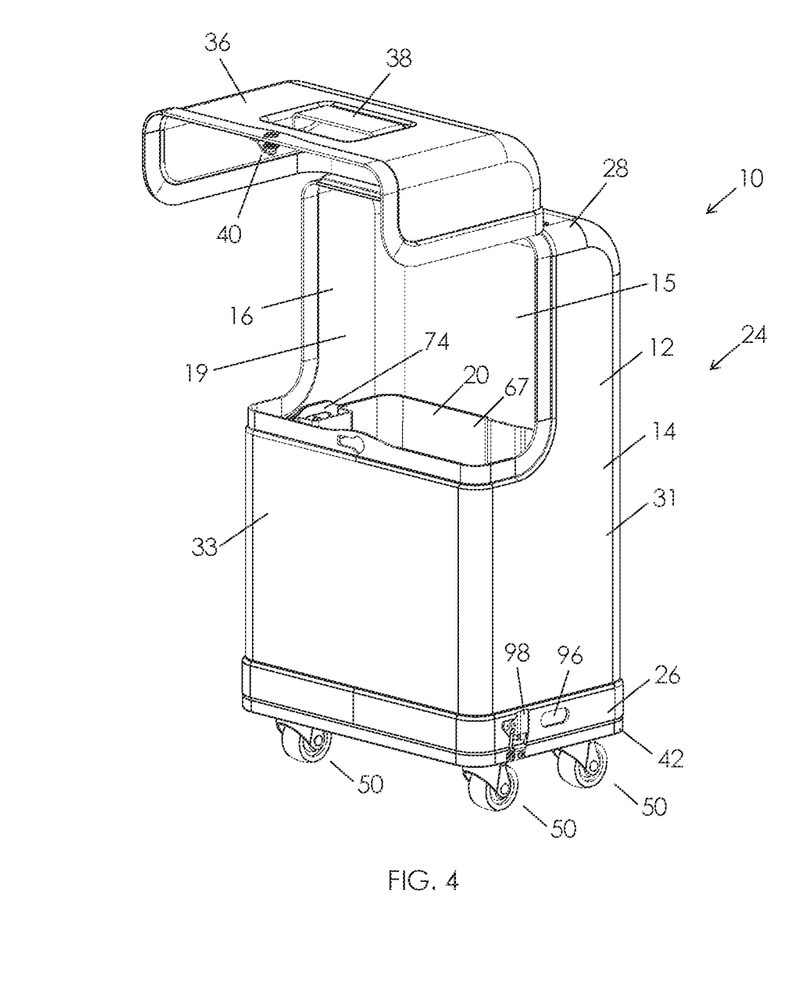
FIG. 4 is a left front perspective view of the similar to FIG. 3, but showing the upper end door open and the compartment in the housing of the luggage.
Figure 5:
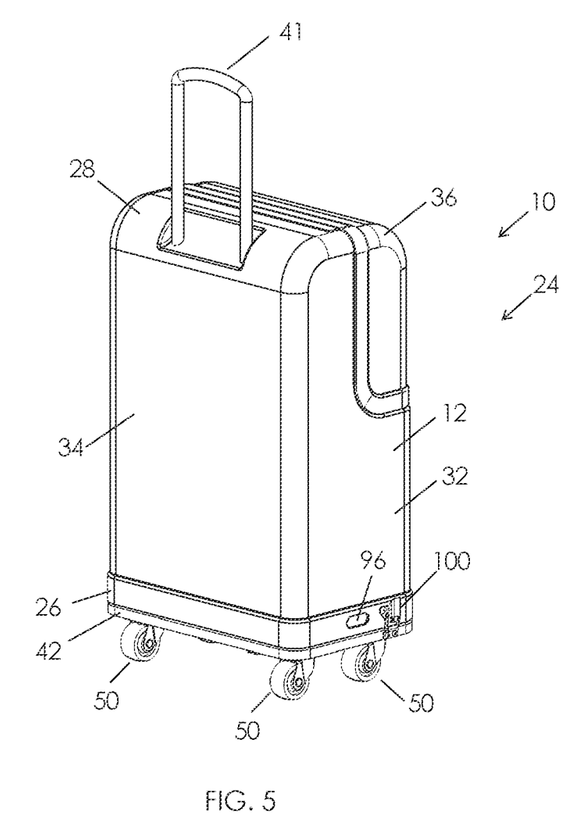
FIG. 5 is a right rear perspective view of the luggage of FIG. 3, but showing the travel handle extended.

Referring to FIGS. 1-7A and 7B, the extendable and retractable luggage 10 ("the luggage") includes a housing 12. The housing 12 includes an outer surface 14 and opening 15 therethrough which forms an inner surface 16 and a compartment 19 (FIGS. 4 and 6) for carrying items therein (not shown). The housing 12 also includes, but not by way of limitation, a module 20 (FIGS. 1-4) connected to the housing 12 which may be positioned in an extended position 22, as illustrated in FIGS. 1, 2 (and 8-10), or in a nested or retracted position 24, as shown in FIGS. 3-5. The module 20 is extendable from a portion 26 of the housing 12 as shown in FIGS. 1, 2, and 8-10.

Figure 6:
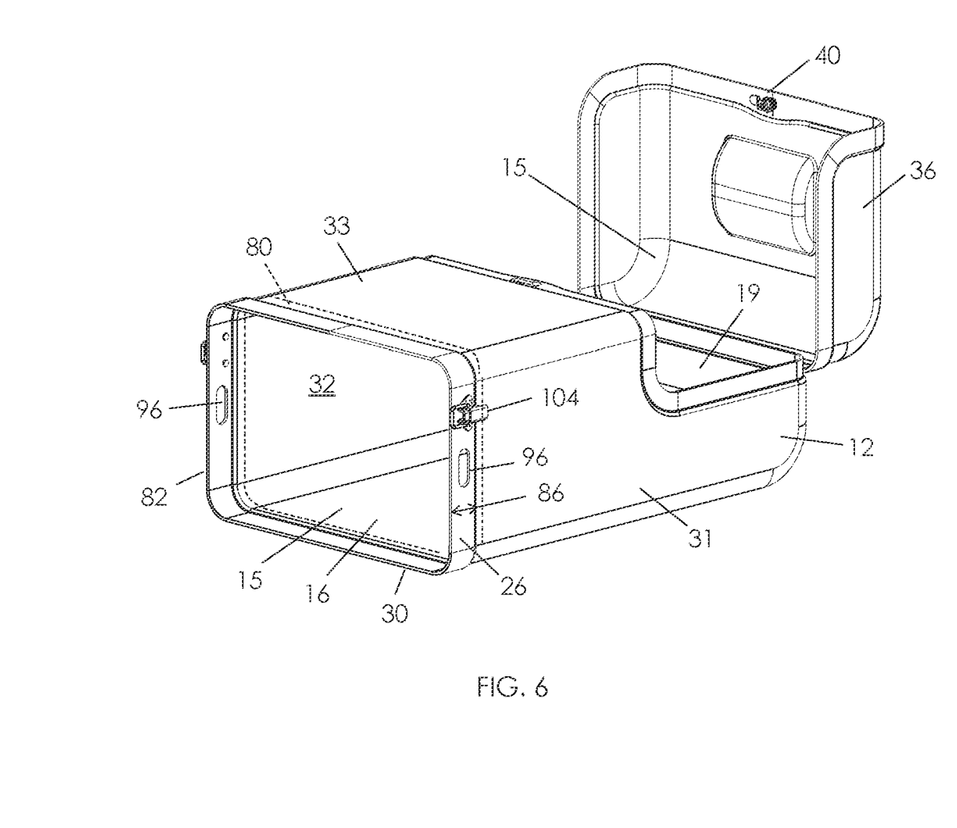
FIG. 6 is a left perspective view of the housing of FIG. 1 positioned horizontally.

Returning to FIGS. 1-7A and 7B, the housing 12 of the luggage 10 also includes an upper end 28, a lower end 30 (FIGS. 8-10), two opposing and spaced-apart left and right sides 31, 32, respectively, a front side 33, and a back side 34, and a lower edge or lower end 35. The luggage 10 also desirably has an upper end door 36 formed from portions of the upper end 28, namely, the front side 33, and the left and right sides 31, 32 of the housing 12. As illustrated in FIG. 2, the upper end door 36 forms a portion of the housing 12 which blends into the curved configuration of the housing 12 when closed, and desirably includes an outer handle 38. The upper end door 36 is desirably pivotally connected via a hinge or other apparatus known in the art (not shown) to the upper end 28 of the housing 12 and is pivotally movable into an open position, as shown in FIGS. 4 and 6. The upper end door 36 in its open position permits ample space to store, access, or remove items within the compartment 19. The upper end door 36, as shown in FIGS. 1 and 4, may also include a first locking apparatus 40. Such apparatus for luggage is known in the art and commercially available. The housing 12 includes an extendable and retractable travel handle 41 connected thereto, which is also known in the art and commercially available. A rear or lower closure for the housing 12 is provided via the module 20 (FIGS. 7A and 7B-12).

Figures 7A, 7B:
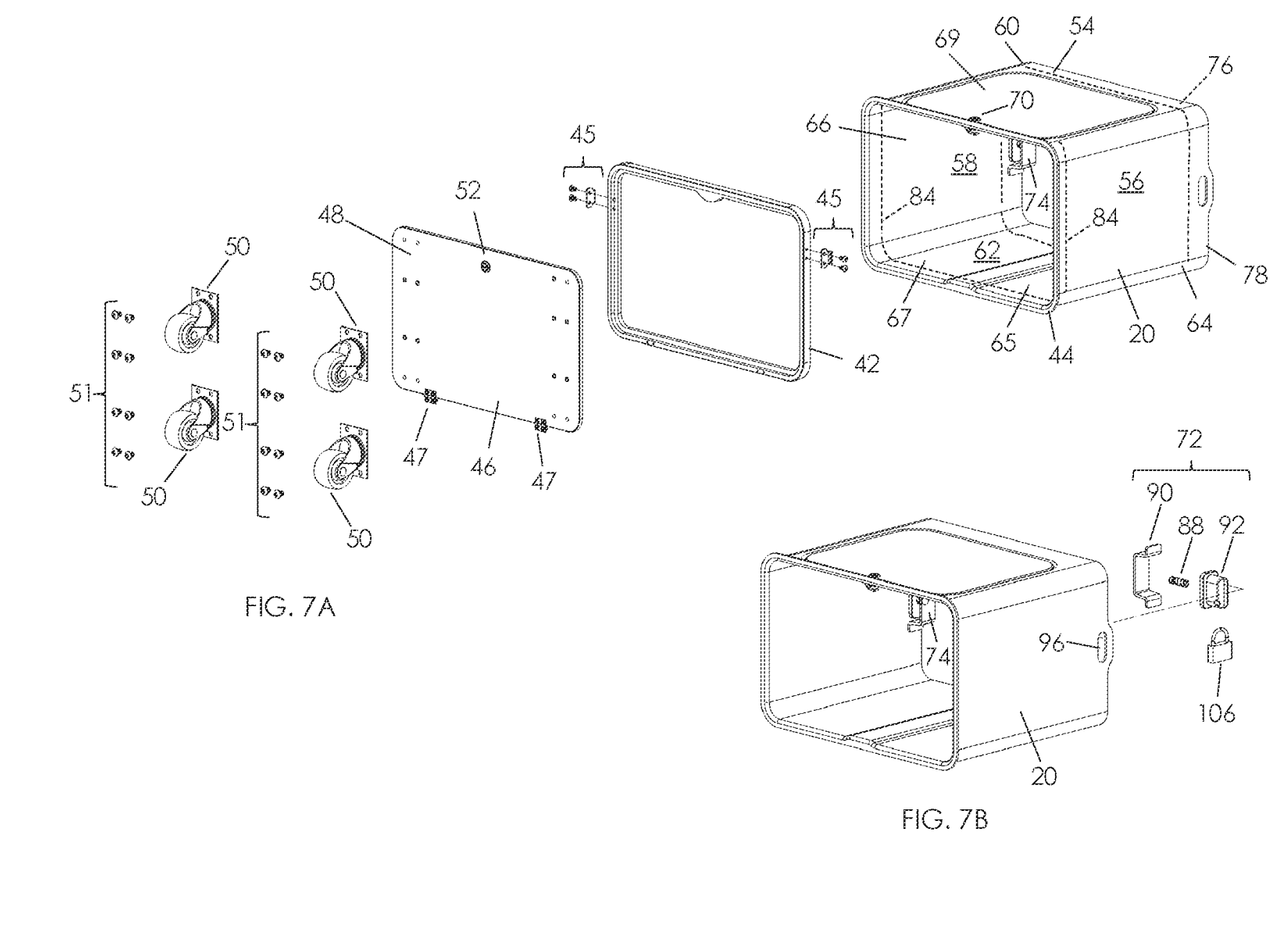
FIG. 7A is an exploded view of the module shown in FIG. 1 positioned horizontally.
FIG. 7B is an exploded view of a portion of the module shown in FIG. 7A, but showing one button latching assembly in an exploded view while an opposite button latching assembly is shown connected to the module.
Figure 8:
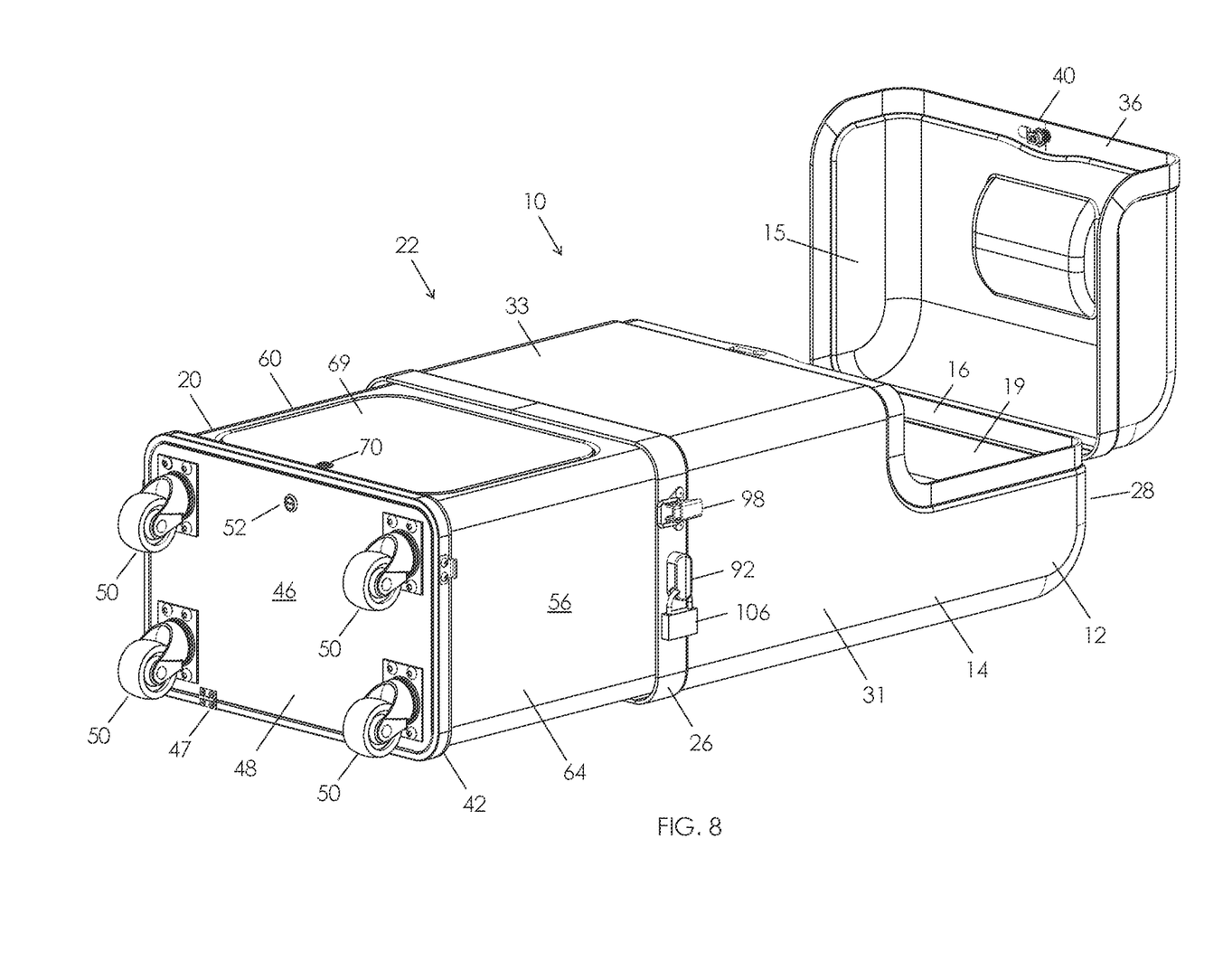
FIG. 8 is a left perspective view of the luggage in an extended position of FIG. 1, positioned horizontally with the upper end door open.
Figure 9:
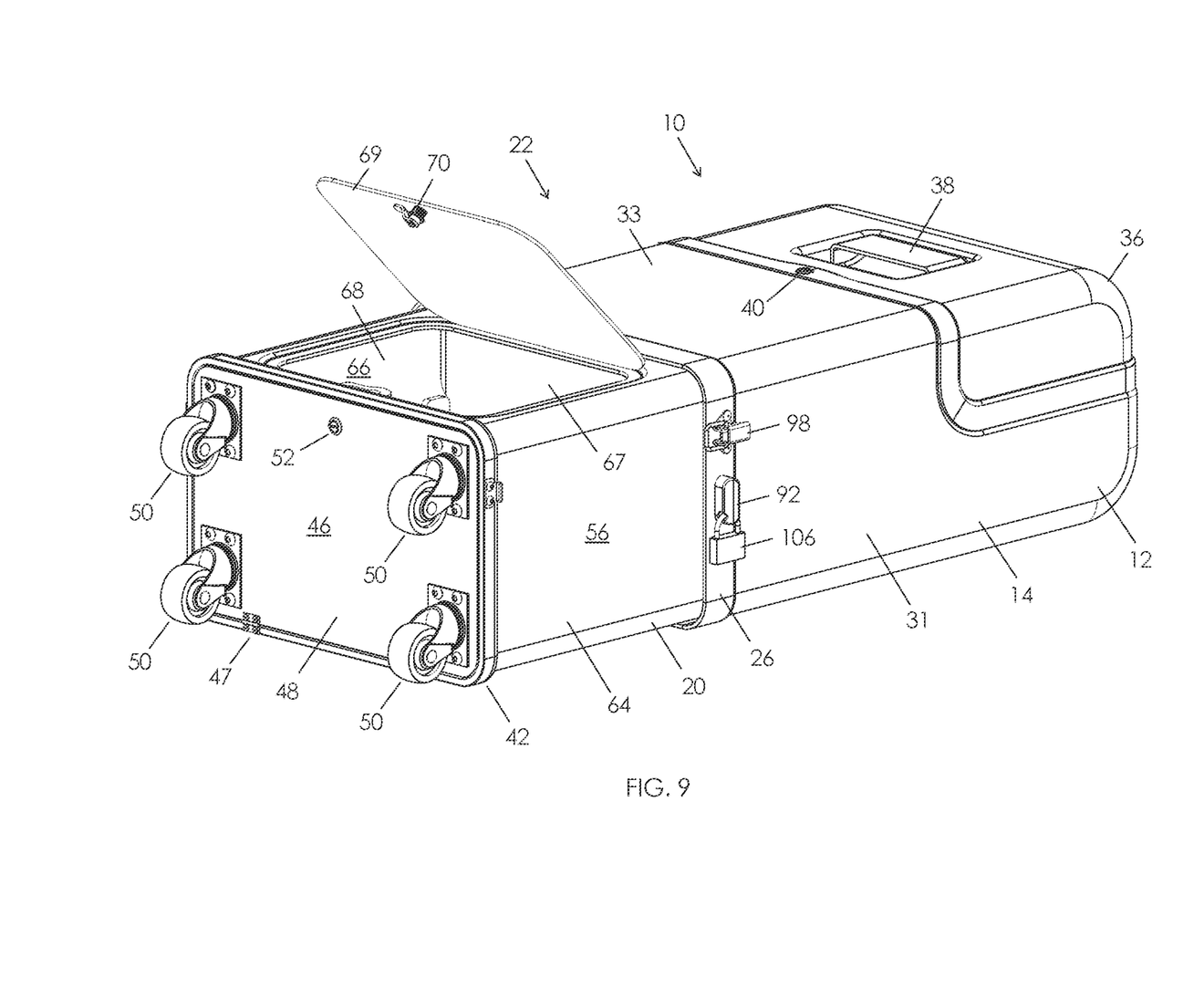
FIG. 9 is a left perspective view of the luggage in an extended position of FIG. 1, positioned horizontally with the front side door of the module opened.
Figure 10:
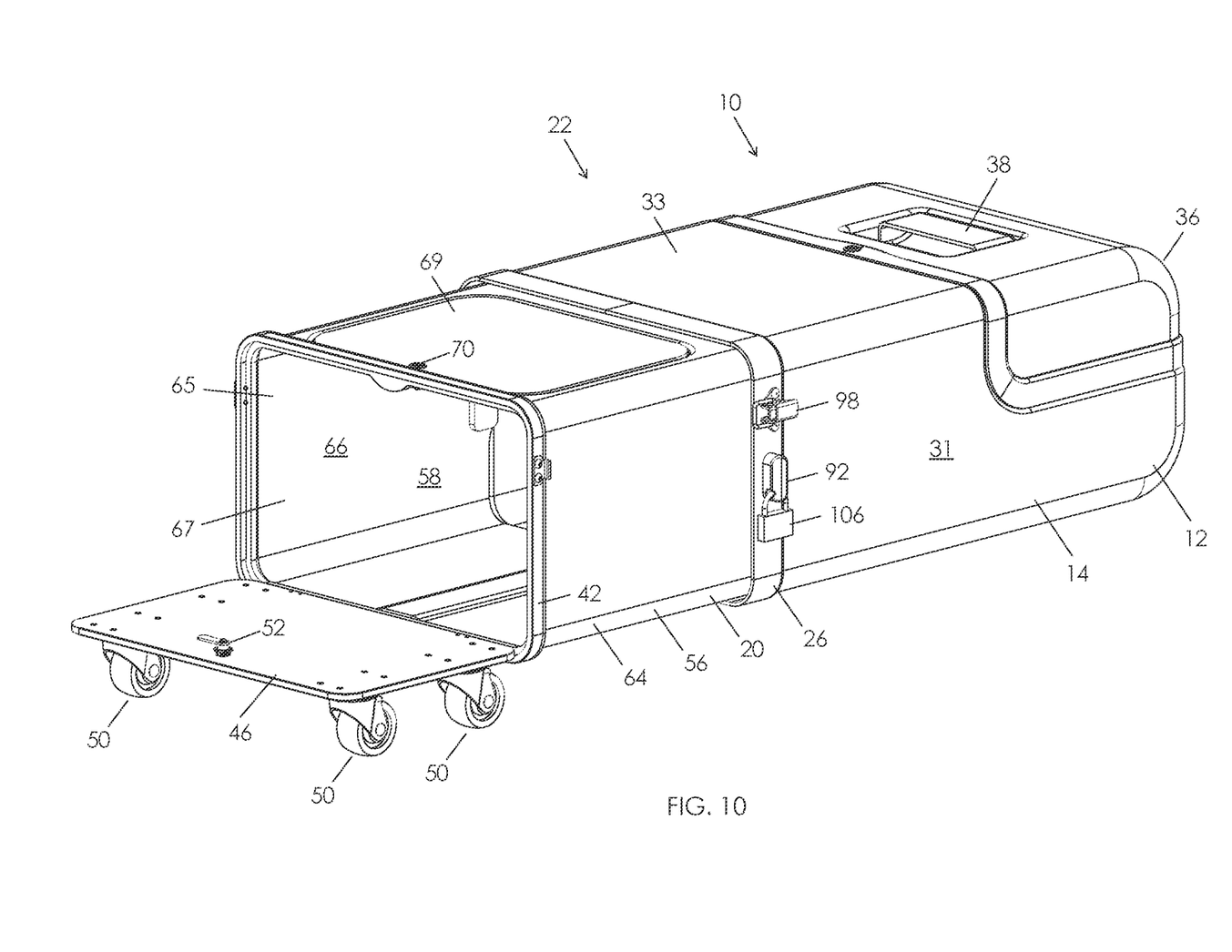
FIG. 10 is a left side perspective view of the luggage in the extended position of FIG. 1, positioned horizontally to show the lower door of the module opened.
Figure 11:
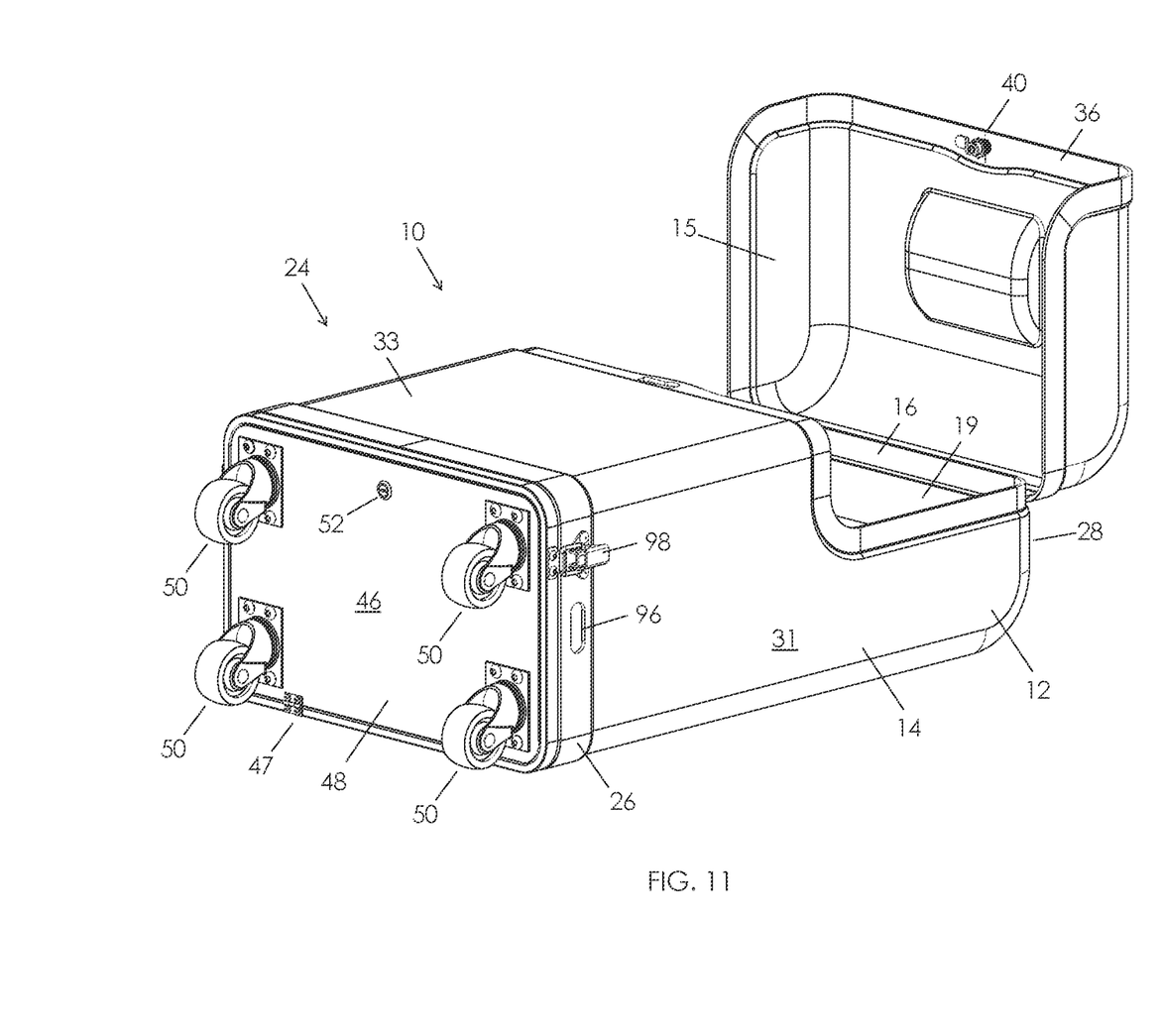
FIG. 11 is a left side perspective view of the luggage of FIG. 1, shown in the retracted position and positioned horizontally to show the upper end door opened.
Figure 12:
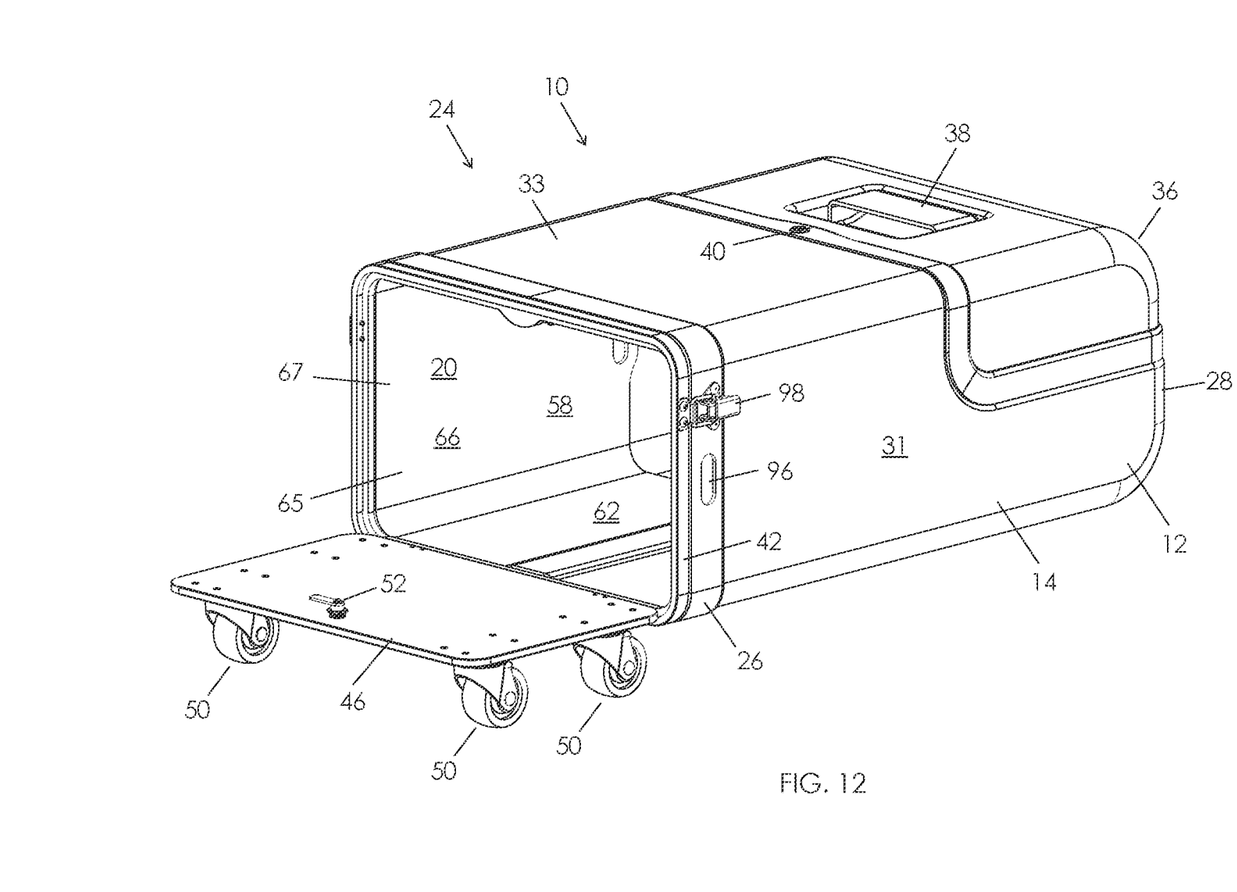
FIG. 12 is a left side perspective view of the luggage of FIG. 1, shown in the retracted position and positioned horizontally to show the rear door open.

Referring now to FIGS. 7A and 7B, the module 20 includes a frame 42 connected to a free end 44 of the module 20 via a plurality of fasteners 45 (such as, for example only, screws, bolts, and the like). A lower door 46 is also connected to the frame 42 via a pair of hinges 47 and provides a closure to a lower end 48 of the module 20. The lower door 46 desirably includes a plurality of wheels 50 connected thereto by a plurality of fasteners 51, to permit the luggage 10 to roll easily. A second locking apparatus 52 may also be provided on the lower door 46, to secure the lower door 46 in a closed, locked position.

Referring to FIGS. 7A and 7B-10, the module 20 also includes an open upper end 54 which is movably connected to the housing 12. As illustrated in FIGS. 1, 2, and 7A and 7B-10, the module 20 has opposing, spaced-apart left and right sides 56, 58, a front side 60, and a back side 62. The module 20 includes an outer surface 64, and an opening 65 extending therethrough, which forms an inner surface 66. The inner surface 66 defines a second compartment 67 which cooperates with the first compartment 19 of the housing 12 to provide a greater storage space or a lesser storage space. A front side opening 68 is formed through the front side 60 of the module 20, and a front side door 69, which is connected via hinges or other connectors known and commercially available (not shown), provides a closure to the front side opening 68. The front side door 69 permits access to store items, access items, or remove items from the module 20 when the luggage 10 is in the extended position 22. This is particularly convenient when the luggage 10 is in the upright, vertical position. A third locking apparatus 70 may be used to secure the front side door 68 in a closed and locked position, to prevent unwanted access.

As illustrated in FIGS. 7A and 7B-12, the outer surface 64 of the module 20 is configured to move or slide within and near or against the inner surface 16 of the housing 12. The outer surface 64 substantially conforms to the configurations of the inner surface 16 of the portion 26 of the housing 12 when the module 20 is positioned in the retracted position 24. As used in this example, "substantially conforms" means that the outer surface 64 will conform to the configurations of the inner surface 16 of the portion 26 by at least 80 percent, and more desirably, by at least 90 percent, and even more desirably by at least 95 percent. The second compartment 67 of the module cooperates with the first compartment 19 of the housing 12 when the luggage 10 is positioned in the retracted position 24 or the extended position 22. The housing 12 and the module 20 are desirably axially aligned. The module 20 desirably may be positioned to extend substantially outward and downward in the vertical position, and away from the portion 26 of the housing 12 in the extended position 22 in other positions, such as a horizontal position, to provide more storage space for items such that the housing first compartment 19 and the module second compartment 61 cooperate to form a larger overall storage space. In this instance, "substantially outward" means that the module 20 extends away from the housing 12 by at least 50 percent, and more preferably by at least 75 percent, and most preferably by at least 90 percent.

Referring to FIGS. 7A and 7B-13A, 13B, and 13C, the module 20, in the extended position, is releasably connected to the portion 26 of the housing 12, and is held in the extended position via respective pair of button latching assemblies 72, 74 positioned on left and right sides 56, 58, respectively, of the inner surface 66 of the module 20, near the upper end 54 thereof. The button latching assemblies 72, 74 are desirably positioned on a margin near the upper end 54 of the module 20 and a margin near the lower end 30 of the housing 12. A "margin" as used herein, means 1) an area or first margin 76 which starts at a rim 78 of the upper end 54 of the module 20, 2) an area or second margin 80 which starts at a rim 82 at the lower end 30 of the portion 26 of the housing 12, and 3) an area or third margin 84 which starts at the frame 42 positioned on the free end 44 of the module 20 and extends upward a distance. The first, second, and third margins 76, 80, and 84, respectively, extend a) over a portion of the module 20 from the rim 78 (first margin 76), b) over a portion of the housing 12 from the rim 82 (second margin 80), and c) over a portion of the module 20 next to the frame 42 (third margin 84), respectively. As shown in FIGS. 6 and 7A, the first, second, and third margins 76, 80, 84, respectively, are delineated by phantom lines, which illustrates the respective margins.

In the extended position 22, the second margin 80 of the housing 12 overlaps the first margin 76 of the module 20, as illustrated in FIGS. 1, 2, 6-10, and 13A-13C. Therefore, margins 76 and 80 are substantially aligned and overlapped when the luggage 10 is in the extended position 22. "Substantially aligned and overlapped" means that first margin 76 and second margin 80 overlap each other by at least 60 percent, more desirably by at least 80 percent, and even more desirably by at least 90 percent. In the retracted position, as shown in FIGS. 1, 2, 8-10, and 13A-13B, the portion 26 of the housing 12 overlaps the module 20 and first margin 76 thereon when the module 20 is moved and held within the housing 12. In this position, however, the second margin 80 of the housing 12, however, overlaps the third margin 84 of the module 20 next to the frame 42, to place the luggage 10 in the retracted position 24.

Preferably, each first, second, and third margins 76, 80, and 84, respectively, has a width 86 (illustrated only in FIG. 6, but applicable to all margins 76, 80, 84) which is desirably, but not by way of limitation, an a range of few inches, such as 0.5 to 2 inches. In some instances, the width 86 of some margins may be wider, such as in a range of 0.5 to 3 inches, and the like. It will also be understood that while the illustrated margins are identified on sides of the module 20 and sides of the housing 12, alternatively, one or more margins may be identified in other locations on the module 20 and/or the housing 12.

Figure 13A:
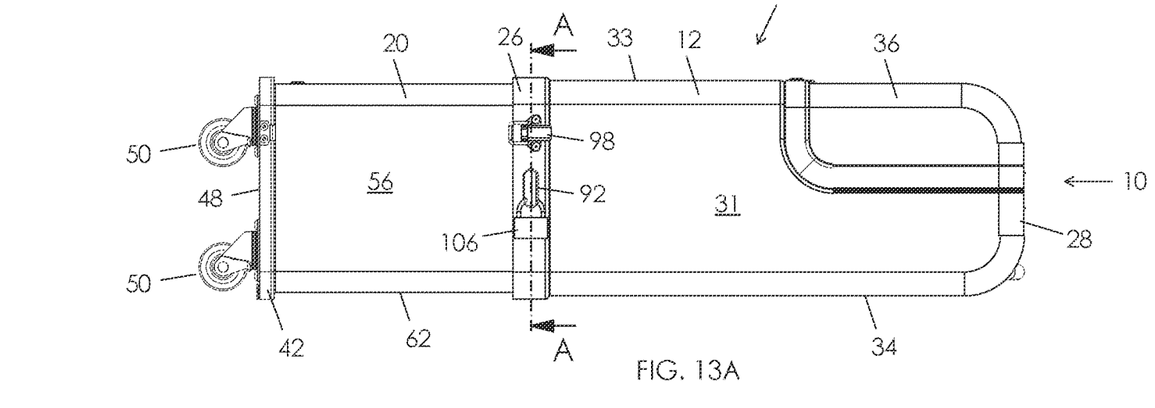
FIG. 13A is a left side perspective view of the luggage of FIG. 1.
Figure 13B:
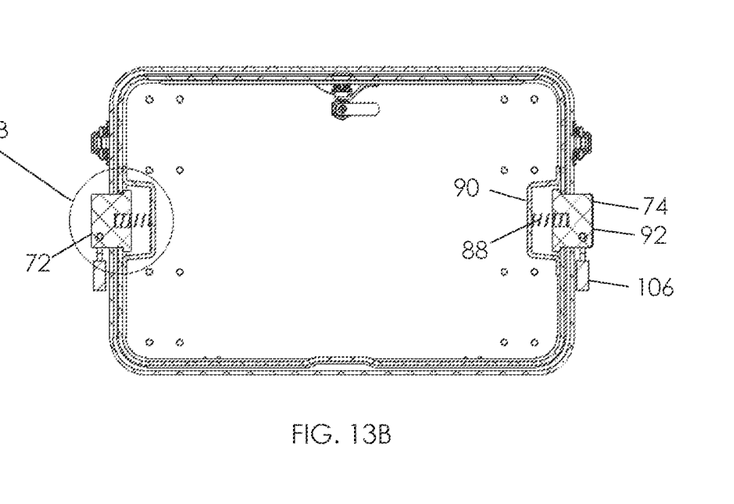
FIG. 13B is a cross-sectional view of FIG. 13A along lines A-A, showing the button latching assemblies.
Figure 13C:
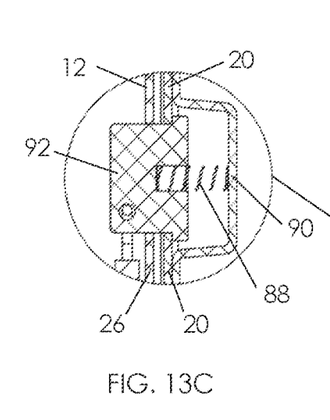
FIG. 13C is an enlarged cross-sectional view of along line (circle) B, showing a portion of FIG. 13B but also showing a cross sectional of one button latching assembly.

Turning back to FIGS. 7B and 13A, 13B and 13C, each of the respective pair of button latching assemblies 72, 74 are positioned in the first margin 76 of each left and right side 56, 58, respectively, of the module 20. Each button latching assembly of the pair 72, 74 includes, but not by way of limitation, a compression element, such as, but not by way of limitation, a spring 88. One end of each spring 88 may be positioned against a retaining plate 90. The retaining plate 90 is positioned against and connected to the inner surface 66 of the module 20 in the first margin 76. An opposite end of each spring 88 is positioned against a button 92. The spring 88 resiliently pushes the button 92 away from the retaining plate 80 and toward an opening formed through the first margin 76 of each respective left and right side 56, 58 of the module 20, as shown in FIGS. 7B and 13C. Each button 92 is configured such that a portion thereof extends at least through a portion of each first opening in the first margin 76 of each side 56, 58 of the module 20, so that when the module 20 is moved into the extended position 22, each button 92 of the pair of button latching assemblies 72, 74 encounters a cooperating and aligned second opening 96 (FIGS. 3, 4, 6, 11, and 12) formed through the second margin 80 on each respective left and right side 28, 30 in the portion 26 of the housing 12. Each button 92 desirably extends through the second opening 96 in the second margin 80 thereby latching and securing the module 20 in the extended position 22 relative to the housing 12.

To move the module 20 out of the extended position 22 into the retracted position 24, each button 92 positioned through each second opening 96 in each second margin 80 of each respective left and right side 28, 30 of the housing 12 is desirably pushed inward while the module 20 is pushed or moved toward the housing 12. When the frame 42 is positioned against the rim 82 of the lower end 35 and the second margin 80 of the housing 12, and the rim 82 overlaps the third margin 84, as shown in FIGS. 3-5, 11, and 12, the retracted position 24 is established. A pair of clasp assemblies 98, 100 may be used to secure the module 20 in the retracted position 24 relative to the housing 12. Turning to FIGS. 1-3, each clasp assembly 98, 100 includes a ring or hook 102 and a clasp 104 which releasably connects to the hook 102. In the present embodiment, the hook 102 may be positioned on the frame 42. The clasp 104 may desirably be connected the housing 12 in the second margin 80 near the lower end 35 of the housing 12. Each respective clasp 104 releasably connects to each respective hook 102 to hold each of the pair of clasp assemblies 98, 100 in a connected, closed position, which holds the module 20 in the retracted position 24. It will be understood that one clasp assembly or a plurality of clasp assemblies may be used. The clasp assemblies are desirably made from metal, and a variety of clasp assemblies are commercially available.

A lock 106 may be attached to a portion of at least one button 92 of at least one button of the pair of buttons latching assemblies 72, 74 to prevent undesired extension of the module 20. A portion of the lock 106 may be inserted through a hole in a button 92. The lock is desirably made from metal, and a variety of locks are commercially available.

It will be appreciated that more than one or more modules 20 may form a part of the luggage 10. It will also be understood that the module 20 may be connected such that the module 20 is positioned over the portion 26 of the housing 12, rather than within the portion 26 of the housing 12 (not shown). Therefore, when the module 20 is positioned in the extended position 22, the module 20 will move from the outside of the portion 22 of the housing 12 to connect to but extend away from the housing 12, and in the retracted position, at least a portion of the module 20 will be positioned over the portion 26 of the housing 12 (not shown).

It will also be appreciated that more than one set of button latching assemblies may be connected to a module 20, and more than one pair of openings may be provided for both the housing 12 and the module 20, to permit limited or maximum expansion of the module 20 (not shown).

The housing 12 and parts thereof, including the module 20, may be constructed from plastic and/or metal(s), and the like. Desirably, the housing 12 and the module 20 are made from a sufficiently thick material or combination of materials such that the housing 12 and the module 20 holds its shape and configuration. Desirably, the housing 12 and module 20 are formed at least partially from a plastic material to provide a "hard shell," which is defined herein as a material which strongly resists deformation, even with rough handling, such as handling when bags are thrown or tossed in and out of an airplane cargo hold. Further desirably, the housing 12 and/or module 20 do not include flexible cloth or plastic material to connect the housing 12 and the module 20 together, or to permit one of the housing or the module to expand from the other of the housing and the module. Hardware such as, for example, but not by way of limitation, the spring(s) 88, and the retaining plate(s) 90, locking apparatus (first, second, and third 40, 52, and 70), fasteners 45 and 51, and the like, may be constructed from metal and/or plastic. Fasteners described and shown herein are commercially available. It will be appreciated that any material or combination of materials may be used for any component described herein, so long as the material or combination of materials perform as shown and/or described in detail herein.

It will be understood that the shape(s) of the housing 12 and/or the module 20 represent only one embodiment, and any shape or size that permits the luggage 10 to function as shown and/or described herein may be used.

The foregoing is considered as illustrative only of the principles of the disclosure. Further, since numerous modifications and changes will readily occur to those of ordinary skill in the art, it is not desired to limit the disclosure to the exact construction and operation shown and described, and accordingly, all suitable modifications and equivalents may be resorted to, and fall within the scope of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Extendable and retractable luggage adapted for travel on an aircraft, the luggage comprising:
    a housing including an outer surface, the housing including an opening in an upper end and an upper end door connected to the housing and configured to close the opening in the upper end, wherein the opening extends through the housing and a lower end thereof to form an inner surface which provides a first compartment for storage, the housing including an open lower end; and
    a module movably connected to the housing, the module including an outer surface and an opening which extends therethrough which forms an inner surface and a second compartment for storage, the module including an open upper end so that the first and second compartments are in movable cooperation to extend and retract, the first compartment configured to permit at least a portion of the outer surface of the module and the second compartment therein to fit within the inner surface and a portion of the first compartment of the housing when the module is in a retracted position, the module configured to extend outward away from the portion of the housing in an extended position,
    wherein the housing and the module are in an axial alignment, such that the extended position and the retracted position of the module within the housing is telescopic within the axial alignment, and
    wherein a first margin of the module and a second margin of the housing overlap each other and connect together in the extended position, and when the first margin and the second margin are released from their connection together, the module is moved into the portion of the housing, and the second margin of the housing overlaps a third margin of the module to provide the retracted position,
    wherein the module includes at least one button assembly, wherein a button of the at least one button assembly is positioned to retractably extend through the first margin of the module and an opening in the second margin of the housing to releasably connect the module and the housing together in the extended position, and
    wherein the second margin of the housing and a frame at a lower end of the module each include a portion of a clasp assembly that, when the second margin of the housing overlaps the third margin of the module, the second margin abuts the frame, and each portion of the clasp assembly is positioned to connect together to hold the housing and the module in the retracted position.

2. The luggage of claim 1, wherein at least one button is adapted to connect to a lock when the luggage is in the extended position.

3. The luggage of claim 1, wherein the frame includes a door to permit access and closure to the lower end of the module.

4. The luggage of claim 3, wherein the door on the lower end of the module includes a plurality of wheels.

5. The luggage of claim 1, wherein the first margin is positioned next to a rim of the lower end of the housing.

6. The luggage of claim 5, wherein the second margin is positioned next to a rim of the upper end of the module.

7. The luggage of claim 6, wherein the third margin is positioned next to a frame on a lower end of the module.

8. The luggage of claim 1, wherein the module includes a front side opening and a front side door.

9. The luggage of claim 8, wherein the housing includes an extendable and retractable handle.

10. The luggage of claim 1, wherein the housing and the module are each formed from a material that forms a solid hard-shell structure that resists deformation.

11. Telescoping luggage adapted for travel on an aircraft, the telescoping luggage comprising:
    a housing including an opening defining an inner perimeter which forms a first compartment therein for storage, the housing including an open lower end; and
    a module movably connected to the housing, the module including an opening therethrough which defines an inner perimeter which forms a second compartment therein for storage, the first compartment and the second compartment in moveable cooperation to expand and retract, the first compartment configured to permit at least a portion of the module to fit within the inner perimeter and a portion of the first compartment of the housing when the module is in a retracted position, the module configured to move to within the housing to extend outward away from the portion of the housing in an extended position,
    wherein the housing and the module are in an axial alignment, such that the telescoping extended position and the retracted position of the module within the housing is maintained in the axial alignment,
    wherein a portion of the module and a portion of the housing overlap each other and connect together when in the extended position, and when the module is retracted within the portion of the housing, a frame at a lower end of the module is positioned against a rim of the housing to form the retracted position, wherein the housing and the module are each formed from a material that forms a solid hard-shell structure that resists deformation, wherein the portion of the module includes a first margin and the portion of the housing includes a second margin, and the first margin and the second margin overlap each other and connect together in the extended position, and wherein when the first margin and the second margin are released from their connection, the module is moved into the housing, and the second margin of the housing overlaps a third margin of the module and abuts the frame to provide the retracted position, wherein the first margin is positioned near to a rim of the lower end of the housing, wherein the second margin is positioned near to a rim of the upper end of the module, and wherein the third margin is positioned near the frame of the module, and wherein the second margin of the housing and the frame at a lower end of the module each include a portion of a clasp assembly that, when the second margin of the housing overlaps the third margin of the module and abuts the frame of the module, each portion of the clasp assembly is positioned to connect together to hold the housing and module in the retracted position.

12. The telescoping luggage of claim 11, wherein the first margin of the module includes the button assembly so that the button is positioned to retractably extend through the first margin of the module and through an opening in the second margin of the housing to releasably connect the module and the housing together in the extended position.

13. The telescoping luggage of claim 11, wherein the frame includes a door to permit access and closure to the module, and wherein the door includes a plurality of wheels.

14. The telescoping luggage of claim 11, wherein the first opening in the housing is covered by an upper end door, and the module includes a front side opening covered by a front side door.

15. The luggage of claim 11, wherein the housing includes an extendable and retractable handle.

* * * * *